United States Patent [19]
Weakley

[11] 3,907,886
[45] Sept. 23, 1975

[54] PROCESS FOR MANUFACTURE OF SUBSTITUTED CARBAMYL HALIDES

[75] Inventor: Martin L. Weakley, Pryor, Okla.

[73] Assignee: Nipak, Inc., Dallas, Tex.

[22] Filed: June 10, 1970

[21] Appl. No.: 48,826

Related U.S. Application Data

[63] Continuation of Ser. No. 542,380, April 13, 1966, abandoned.

[52] U.S. Cl............................................. 260/544 C
[51] Int. Cl............................................. C07c 51/58
[58] Field of Search..................... 260/544 C, 544 A

[56] References Cited
UNITED STATES PATENTS

| | | | |
|---|---|---|---|
| 2,908,703 | 10/1959 | Latourette | 260/453 |
| 3,152,175 | 10/1964 | Ottenheym | 260/544 |

*Primary Examiner*—Lorraine A. Weinberger
*Assistant Examiner*—Richard D. Kelly
*Attorney, Agent, or Firm*—Howard E. Moore

[57] ABSTRACT

A process for producing carbamyl compounds such as dimethylcarbamyl chloride, which includes passing substantially stoichiometric quantities of a carbonyl compound, such as carbonyl chloride (phosgene), and an amine, such as dimethyl amine, through a body of a liquefied carbonyl compound. The carbamyl compound may be continuously withdrawn as a liquid product. A unique start-up technique is also disclosed in which a carbonyl compound is introduced to the reactor and a liquid reflux of the carbonyl compound is established. Once a body of the carbonyl compound is established, the amine and the carbonyl compound are then introduced in the stoichiometrically reactive amounts.

8 Claims, 1 Drawing Figure

US Patent  Sept. 23, 1975  3,907,886
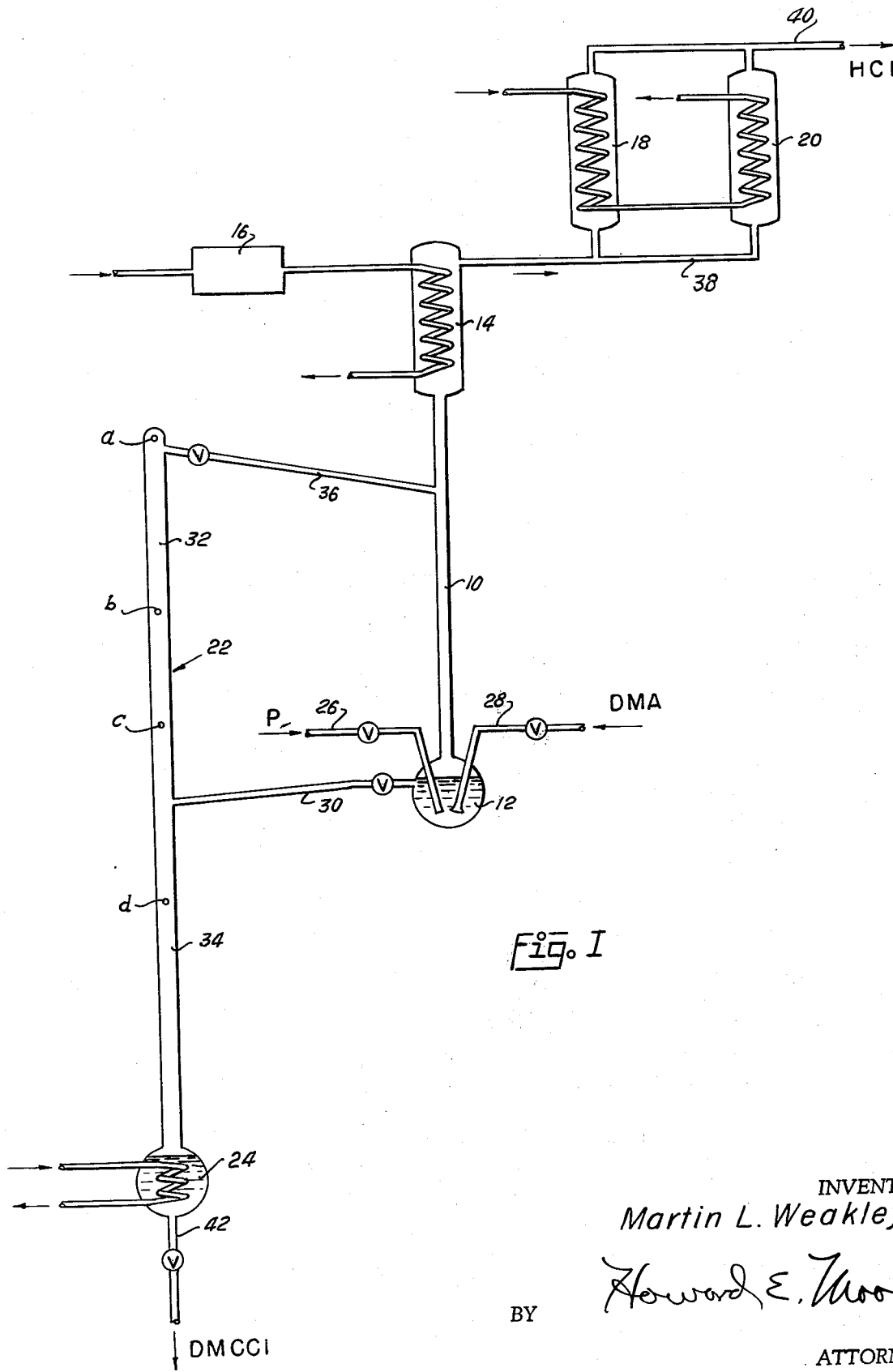
Fig. I
INVENTOR
Martin L. Weakley
BY Howard E. Moore
ATTORNEY

PROCESS FOR MANUFACTURE OF SUBSTITUTED CARBAMYL HALIDES

This application is a streamlined continuation of Ser. No. 542,380, filed Apr. 13, 1966, and now abandoned.

The present invention relates to a process for the preparation of substituted carbamyl compounds. In a more specific aspect, the present invention relates to a process for the preparation of substituted carbamyl halides by the reaction of a carbonyl halide with an amine.

It has heretofore been proposed that various substituted carbamyl compounds can be produced by the reaction of a carbonyl compound with a variety of amines, either at low or high temperatures. For example, N, N-dimethylcarbamyl chloride has heretofore been prepared by the reaction of phosgene with either dimethylamine or trimethylamine. When carrying out the reaction of these materials at ambient or lower temperatures and ambient pressures, it has been the universal custom to dissolve the reactants in appropriate inert solvents. For example, the reactants have been dissolved in methyl alcohol, benzene, toluene or other suitable materials which are mutual solvents for the reactants and the two solutions are then contacted with one another at temperatures in the neighborhood of 10° to 70° C. These reactions have been carried out in a batch-type operation and are thus commercially unacceptable. In addition, the best reported yield of dimethylcarbamyl chloride has been 75% of the theoretical based on the amount of amine utilized. Of course, the yields of the majority of the current techniques fall well below this value. Further, these processes produce substantial amounts of dimethylamine hydrochloride as a by-product. This material is extremely difficult to separate from the desired dimethylcarbamyl chloride, and such separation will, of course, require additional equipment. Further, the inert solvent used as the reaction medium must also be removed from the product and this, too, requires additional equipment and creates additional problems. The presence of such solvents can also lead to extraneous reactions which not only complicate purification techniques but reduce the yield of a desired product. In another of the basic techniques for the preparation of substituted carbamyl compounds the necessity of utilizing an extraneous solvent is eliminated by carrying out the reaction in the vapor phase at high temperatures. Such reactions, for the production of dimethylcarbamyl chloride, involve the direct contact of phosgene and vapor phase amines at temperatures anywhere from 60° to 350° C. The success of these processes appears to be based on the use of an excess of phosgene over stoichiometric requirements. The excess phosgene is in some cases decomposed with steam which leads to further complications because of the ready solubility of the reactants and products in water. Further, when such a process is utilized, hydrogen chloride and phosgene in varying amounts are dissolved in the product mixture thus requiring further processing for their removal. One such purification technique involves refluxing the product mixture with one-half its weight of dry toluene to drive out the impurities and finally distilling to remove the solvent.

In view of the above difficulties, as well as numerous other difficulties not mentioned, it is an object of the present invention to provide an improved process for the production of substituted carbamyl compounds.

A still further object of the present invention is to provide an improved process for the production of substituted carbamyl compounds by the reaction of a carbonyl compound with an amine.

Yet another object of the present invention is to provide an improved process for the production of dimethylcarbamyl chloride by the reaction of phosgene with an amine.

Another and further object of the present invention is to provide an improved process for the production of dimethylcarbamyl chloride by the reaction of phosgene with alkyl substituted amines.

A further object of the present invention is to provide an improved process for the production of substituted carbamyl compounds wherein products of surprisingly high purity are obtained.

Yet another object of the present invention is to provide an improved process for the production of substituted carbamyl compounds by the low temperature liquid phase reaction of a carbonyl compound and an amine.

Another and further object of the present invention is to provide an improved process for the production of substituted carbamyl chlorides by the reaction of phosgene with an amine wherein the production of amine hydrochloride is substantially eliminated.

Another object of the present invention is to provide an improved process for the production of substituted carbamyl chlorides by the reaction of phosgene with an amine wherein substantially pure carbamyl chloride and substantially pure hydrogen chloride are recovered without the necessity of removing contaminating amine hydrochlorides.

A further object of the present invention is to provide an improved process for the production of substituted carbamyl compounds by the reaction of a carbonyl compound and an amine in substantially stoichiometric quantities.

A yet further object of the present invention is to provide an improved technique for starting-up a process for the production of substituted carbamyl compounds by the reaction of a carbonyl compound and an amine.

These and other objects and advantages of the present invention will be apparent from the following detailed description when read in conjunction with the drawing which illustrates appropriate equipment for the conduct of the novel process of the present invention.

Briefly, in accordance with the present invention, substantially pure carbamyl compounds are produced by passing an amine through a body of a liquefied carbonyl compound. In addition, by passing substantially stoichiometric quantities of the carbonyl compound and amine to the reactor one may thereafter recover a substituted carbamyl halide as a liquid in substantially pure form. By practicing the method in this manner it has been found that once initiated the reaction can be carried out continuously. Further in accordance with the present invention, it has been found advantageous to employ a novel start-up technique to initiate the reaction. In general, this technique involves heating a quantity of the substituted carbamyl product in a rectifying column until reflux is noted in the bottom of the column. At the same time the carbonyl compound is introduced into a reaction chamber equipped with an appropriate condenser until carbonyl compound reflux is noted in the condenser. Having noted the reflux of substituted carbamyl compound and the reflux of the carbonyl compound, the amine is then introduced to the reactor and the supply of carbonyl compound is continued so that the two materials are being delivered to the reactor in stoichiometric quantities or at a molar ratio of substantially one to one.

As an example, the reaction of phosgene with dimethylamine, is thus believed to proceed in accordance with the following formula without the production of any unwanted byproducts, such as amine hydrochlorides.

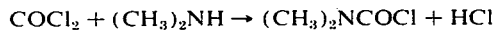

$$COCl_2 + (CH_3)_2NH \rightarrow (CH_3)_2NCOCl + HCl$$

While applicant does not wish to be limited by any particular theory of operation, it is believed that the effectiveness of the present technique depends upon the utilization of the carbonyl compound itself and/or the substituted carbamyl compound product as a solvent medium. Thus, whereas the prior art individually dissolved the carbonyl compound and the amine in various liquid solvents and then brought the two solutions together at relatively low temperatures the process of the present invention maintains a temperature in the reactor sufficiently low that a body of the liquid carbonyl compound can be maintained in the reactor and the carbonyl compound and amine are then introduced directly into the body of liquid carbonyl compound without solution in any extraneous material other than the substituted carbamyl compound product. By appropriately cooling and condensing reactants vaporized in the reactor above the body of liquid such reactants may be refluxed to the reactor while permitting gaseous products to pass through the condenser system and be recovered as a gas. The substituted carbamyl compound product can then be passed to an appropriate rectifying column where residual gases and reactant carbonyl compound and amine are removed by heating the substituted carbamyl compound product to a temperature in the vicinity of its boiling point. The separated gases, of course, pass through the condenser system and are recovered while the unreacted carbonyl compound and amine are returned to the reactor.

An appropriate apparatus for carrying out the process of the present invention is shown in the accompanying drawing.

In accordance with the drawing, an appropriate empty tube-type column 10 is provided at its bottom with an enlarged reaction section 12. Communicating directly with the top of column 10 is primary condenser 14. Condenser 14 is cooled by an appropriate cooling medium, such as an ethylene glycol-water solution supplied from a low temperature bath 16. Primary condenser 14 is in open communication with secondary condensers 18 and 20. Secondary condensers 18 and 20 are indirectly cooled by an appropriate cooling medium, such as a slurry of acetone and solid carbon dioxide. In communication with column 10 and reactor 12 is a rectifying column 22. Column 22 is preferably packed with an inert contact material, such as beryl saddles, and is preferably heated by an appropriate heating means, such as heating tape, so that predetermined temperatures may be maintained along the length of the column, for example, at points $a$, $b$, $c$, and $d$, respectively. In open communication with the bottom of column 20 is reboiler 24. Reboiler 24 may be a thermosyphon-type reboiler or other appropriate type. Carbonyl compound is introduced to reactor 12 through line 26, which reaches nearly to the bottom of the reactor. Similarly, amine is introduced through line 28, which is preferably fluted at the bottom to prevent plugging. Substituted carbamyl compound flows from reactor 12 to column 22 adjacent the center thereof through line 30. Accordingly, column 22 is divided into an upper separation section 32 and a lower reflux section 34. Separated vapors from column 22 pass to column 10 through line 36, as indicated by the dashed line. Vapors leaving condenser 14 pass to condensers 18 and 20 through lines 38 and vapors from condensers 18 and 20 are discharged through lines 40. Substituted carbamyl compound product is continuously withdrawn through line 42.

The operation of the apparatus will now be described by specific reference to the reaction of phosgene with dimethylamine to produce dimethylcarbamyl chloride. In accordance with the process, a quantity of dimethylcarbamyl chloride is added to reboiler 24 and the reboiler is heated indirectly by steam or another appropriate material. Column 22 is also heated by an appropriate heating jacket as indicated. By way of example, the temperature maintained in reboiler 24 should be in the neighborhood of about 165° to 170° C. which, of course, is in the vicinity of the boiling point of dimethylcarbamyl chloride (165° to 166° C.). The temperature at point $a$ of column 24 may vary from about 50° to 110° C., at point $b$ from about 65° to 120° C., at point $c$ from about 65° to 125° C., and at point $d$ from about 160° to 170° C. The dimethylcarbamyl chloride is heated in reboiler 24 until reflux is noted at temperature control point $d$ in reflux section 34 of column 22. At the same time, a slurry of acetone and carbon dioxide is circulated through secondary condensers 18 and 20 and an ethylene glycol-water solution is circulated from low temperature bath 16 through primary condenser 14. The temperature maintained in secondary condensers 18 and 20 is between about −50° and −77° C. and in primary condenser 14 is between about −10° and −30° C. Liquefied phosgene (boiling point from about 8.3° C.) is introduced to the bottom of reactor 12. The introduction of phosgene is continued until reflux is noted in condenser 14, which is operating at a temperature of minus 20° C. As soon as the reflux dimethylcarbamyl chloride is noted in reflux section 34 of column 22 and reflux of phosgene is noted in condenser 14, introduction of dimethylamine is begun. The dimethylamine (boiling point of about 7.4° C.) is also introduced to the bottom of reactor 12 below the body of liquid phosgene. With the operating conditions previously indicated, the temperature in reactor 12 has been found to range from about 0° to 30° C., but preferably at 0° to 10° C. The method can thereafter be carried out in an essentially continuous manner by continuing the introduction of phosgene and dimethylamine in the molar ratio of about one to one. Liquid dimethylcarbamyl chloride formed in reactor 12 overflows through line 30 to reflux section 34 of column 22. This liquid product will, of course, carry with it some entrained hydrogen chloride and reactant phosgene and dimethylamine. Phosgene, dimethylamine and hydrogen chloride escaping from the surface of liquid in reactor 12 can also rise through column 10. However, since condenser 14 is operated at a temperature well below the boiling point of either of the reactants, these reactants will be liquefied and returned to reactor 12 by trickling down the wetted inner wall of column 10.

However, since the boiling point of hydrogen chloride is about −83.7° C., the hydrogen chloride will pass through condensers 14, 18 and 20 and can be recovered as a gaseous product as indicated. At this point, it should be emphasized that the hydrogen chloride is also a valuable product of the reaction and that the instant process produces a gaseous hydrogen chloride in substantially pure form. There is thus no contamination by dimethylamine hydrochloride, methylchloride or other products, and, certainly, none by extraneous solvents, since none have been used. The liquid dimethylcarbamyl chloride passes down reflux section 34 of column 22, countercurrent to hydrogen chloride, phosgene, dimethylamine and vaporized dimethylcarbamyl chloride emanating from reboiler 24. Thus, the liquid dimethylcarbamyl chloride is partially scrubbed or stripped of contaminating hydrogen chloride, phosgene and dimethylamine as it passes to the reboiler. Any residual contaminants will, of course, be vaporized in reboiler 24 and rise through reflux section 34 to separation section 32. The vapors passing up reflux section 34 will also, because of the temperatures maintained therein, have some dimethylcarbamyl chloride present therein. This will normally be condensed or liquefied before the vaporous components enter separation section 32 of column 22. However, any residual dimethylcarbamyl chloride carried into section 32 will, of course, be separated therefrom by condensation due to the lower temperature existent in section 32. Thus, hydrogen chloride, phosgene and dimethylamine, substantially free of dimethylcarbamyl chloride, pass from the top of separation section 32 of column 22 to the top of column 10 through line 36. As previously indicated, this vaporous mixture will enter primary condensers 14, 18 and 20; but, because of the low temperatures maintained in the condensers, the phosgene and dimethylamine will be condensed and returned to reactor 12 down the inner walls of column 10. Hydrogen chloride passes through both the primary and secondary condensers as a substantially pure gas. Dimethylcarbamyl chloride is continuously withdrawn from reboiler 24 as a substantially pure product.

The process of the present invention may be conveniently employed for the production of any substituted carbamyl compound by the reaction of an appropriate amine with a carbonyl compound. Appropriate amines may include the mono-substituted amines, such as methylamine, ethylamine, etc., the di-substituted amines, such as dimethylamine, diethylene amine, dibutyl amine, dianyl amine, etc., tri-substituted amines, such as trimethylamine, triethylamine, etc. and aromatic amines such as phenyl amine. Preferably however, dimethylcarbamyl chloride is produced by reaction of phosgene with dimethyl amine. As a matter of fact, the present technique appears to be the first practical technique utilizing trimethylamine for the production of dimethylcarbamyl chloride. While as previously indicated, trimethylamine has heretofore been reacted with phosgene by dissolving the reactants in appropriate solvents and then bringing them together in a batch-type reaction or by direct contact at high temperatures in the vapor phase, it has been found that the complication of contamination and undesirable byproduct production are substantially greater when utilizing trimethylamine as opposed to dimethylamine. Accordingly, prior art workers have essentially confined their operation to the use of dimethylamine even though this material is substantially more expensive. In this reaction methyl chloride (boiling point −23.7° C.) is produced as a gaseous product. This material is just as valuable as hydrogen chloride and its production in substantially pure form is therefore highly desirable. The temperature and/or pressure conditions would necessarily vary when using amines other than dimethylamine. For example, when using diethylamine the temperatures would be slightly different than for dimethylamine. Specifically, a reboiler temperature of about 185° to 195° C. and a reactor temperature of about 9° to 15° would be appropriate. Suitable carbonyl compounds which may be utilized, include: carbonyl chloride (phosgene), thiocarbonyl chloride, carbonyl bromide, carbonyl fluoride, carbonyl sulfide, etc. The carbonyl chlorides are, however, preferred since pressure equipment is required in the case of some of the other carbonyl compounds, some of the other carbonyl compounds are relatively expensive, and problems sometimes arise in the handling and disposal of product gases from certain of the other carbonyl compounds.

As previously indicated, one of the primary features of the present invention is the utilization of stoichiometric volumes of carbonyl compound and amine, i.e. a molar ratio of 1/1. It is, however, possible to operate, in accordance with the present invention, utilizing a molar ratio of carbonyl compound to amine of about 0.8/1 to 1.2/1. However, it should be recognized that even these small departures from a ratio of 1/1 tend toward impure products, uneconomical operation and operational problems of the prior art.

The following specific examples of the operation of the present invention clearly show the many advantages of operating in accordance with the present invention as well as the need of operating with a molar ratio of halide to amine of about one to one.

EXAMPLE I

After the initiation of the reaction, as previously indicated, a record of conditions was made until consistency of temperature, rates, and levels of flows was obtained. For a specific period of time, date of conditions of reactant feed rates, and of product were collected. Overall results were calculated from this information and representative average properties of the run were recorded. Representative temperatures in this experiment were as follows: reboiler, 165° – 166° C.; bottom column temperature, 163° – 165° C.; middle column thermometer, 68° – 103° C.; top column thermometer, 82° – 105° C.; top thermometer, 68° – 95° C.; and reactor, 4° – 9° C. Phosgene was added at a rate of 557 to 613 ml. per minute or a total of 247.1 l. at standard temperature and pressure (11.02 moles). Dimethylamine was introduced at a rate of 562 ml. per minute or a total of 236.0 l. at standard conditions (10.53 moles). The ratio of phosgene to dimethylamine was 1.05. During the 7 hour run, a total of 1039.7 g. of product was collected. The product assayed 100% dimethylcarbamyl chloride and less than 0.5% dimethylamine hydrochloride (limits of the analytical method). The yield of dimethylcarbamyl chloride was 9.67 moles or 91.9% of theory, based on the dimethylamine.

EXAMPLE II

This run was made in the same general manner as previously described. Temperatures in this case were: reboiler, 166° C.; bottom thermometer, 165° – 167° C.;

middle column thermometer, 66° – 109° C.; top column thermometer, 66° – 113° C.; top thermometer, 65° – 109° C.; and reactor, 7° – 26° C. Phosgene was added at a rate of 433 to 557 ml. per minute or a total of 297 l. at standard conditions (13.25 moles). Dimethylamine was added at a rate of 562 ml. per minute or a total of 337.2 l. at standard conditions (15.04 moles). The ratio of phosgene to dimethylamine was 0.88. During this 10 hour run, a total of 1432.2 g. of product was collected. The product assayed 93.2% as dimethylcarbamyl chloride. The yield of dimethylcarbamyl chloride was 12.42 moles or 82.6% of theory, based on the dimethylamine.

EXAMPLE III

Operational conditions were as previously cited with temperatures as follows: reboiler, 165° – 166° C.; bottom column thermometer, 165° – 167° C.; middle column thermometer, 112° – 123° C.; top column thermometer, 100° – 117° C.; top thermometer, 95° – 105° C.; and reactor, 11° – 17° C. Phosgene was added at a rate of 518 ml. per minute or a total of 127.4 l. at standard conditions (7.17 moles). The ratio of phosgene to dimethylamine was 0.92. During the 246 minute run, a total of 656.6 g. of product was collected. The product assayed 96.2% as dimethylcarbamyl chloride. The yield of dimethylcarbamyl chloride was 5.88 moles or 95.5% of theory, based on the dimethylamine.

EXAMPLE IV

Although conditions of this experiment were similar to earlier runs, the higher gas flows caused a readily detectable loss of reactant gases. The limits of the equipment seemed to have been exceeded. Temperature conditions were: reboiler, 166° C.; bottom column thermometer, 163° – 165° C.; middle column thermometer, 60° – 95° C.; top column thermometer, 66° – 98° C.; top thermometer, 53° – 90° C.; and reactor, 4.5° – 8° C. Phosgene was added at a rate of 802 to 839 ml. per minute or a total of 401.2 l. at standard conditions (17.89 moles). Dimethylamine was added at a rate of 787 ml. per minute or a total of 330.5 l. at standard conditions (14.74 moles). The ratio of phosgene to dimethylamine was 1.21. During the 7 hour run, a total of 1440.1 g. of product was collected. The material assayed 100% as dimethylcarbamyl chloride. The yield of dimethylcarbamyl chloride was 13.39 moles or 90.8% of theory, based on the dimethylamine.

EXAMPLE V

The system as used for the preparation of dimethylcarbamyl chloride was modified with the use of a Lapp Pulsefeeder Pump to add liquid diethylamine at a measured rate. It was necessary to use an oil heater on the reactor outlet to maintain desirable column temperatures. Representative temperatures in this experiment were as follows: reboiler, 188° – 194° C.; bottom column thermometer, 89° – 92° C.; middle column thermometer, 21° – 54° C.; top thermometer, 32° – 50° C.; reactor, 9.5° – 10° C.; and oil preheater, 161° – 165° C. Phosgene was added at a rate of 70 to 87 ml. per minute or a total of 23.87 l. at standard conditions (1.06 moles). Diethylamine was added at a rate of 1.54 ml. per minute or a total of 337.5 g. (4.62 moles). During the 307 minute run, 455 g. of material containing 166 g. (1.52 moles) of diethylamine hydrochloride was collected. A resultant amount of 3.10 moles of diethylamine was used in diethylcarbamyl chloride preparation. The yield of diethylcarbamyl chloride was 289 g. (2.13 moles) or 68.7% of theory based on the diethylamine.

This experiment further demonstrates the requirement for maintaining a high phosgene concentration in the reaction zone to retard hydrochloride formation.

The products of the present invention have many uses in industry. For example, dimethylcarbamyl chloride is a useful, highly reactive, chemical intermediate. It has been used in the preparation of dimethyl substituted ureas.

While specific materials and conditions have been suggested and specific operations given by way of example, it is to be understood that such suggestions and examples are directed to those skilled in the art and variations therefrom and modifications thereof will occur to such skilled workers without departing from the basic teachings of the present invention. Accordingly, the present invention is to be limited only in accordance with the appended claims.

I claim:

1. A continuous process for the manufacture of dialkyl carbamyl chlorides, comprising:
    a. simultaneously passing phosgene and a dialkyl amine, selected from the group consisting of dimethyl amine and diethyl amine, at a mol ratio of phosgene to amine of at least one to one, into a body of liquified phosgene in a reaction zone maintained at a temperature of about 0° to 30° C;
    b. continuously withdrawing a liquid reaction product containing said dialkyl carbamyl chloride from said reaction zone;
    c. condensing phosgene, which vaporizes from said body of liquified phosgene, to separate the same from hydrogen chloride; and
    d. continuously withdrawing a vaporous product comprising hydrogen chloride from said reaction zone.

2. A process in accordance with claim 1 wherein the molar ratio of phosgene to amine, in addition to the phosgene utilized as a solvent, is between about 1 to 1 and 1.2 to 1.

3. A process in accordance with claim 2 wherein the molar ratio of phosgene to amine is about 1 to 1.

4. A process in accordance with claim 1 wherein a reflux of liquefied phosgene is maintained above the reaction zone by cooling the vapors emanating from said reaction zone.

5. A process in accordance with claim 1 wherein dialkyl carbamyl chloride is continuously withdrawn from the reaction zone.

6. A process in accordance with claim 1 wherein the reaction temperature is maintained between about 0° and 30°C.

7. A process in accordance with claim 1 wherein the amine is dimethyl amine.

8. A process in accordance with claim 1 wherein the amine is diethyl amine.

* * * * *